Jan. 17, 1956  K. FEDERN  2,731,592
PHOTOELECTRICALLY CONTROLLED APPARATUS FOR PRODUCING
ALTERNATING CURRENTS IN SYNCHRONISM WITH
ROTATION OF STRUCTURE
Filed Sept. 4, 1952

United States Patent Office 2,731,592
Patented Jan. 17, 1956

2,731,592

PHOTOELECTRICALLY CONTROLLED APPARATUS FOR PRODUCING ALTERNATING CURRENTS IN SYNCHRONISM WITH ROTATION OF STRUCTURE

Klaus Federn, Darmstadt, Germany, assignor to Carl Schenck Maschinenfabrik G. m. b. H., Darmstadt, Germany, a corporation of Germany Application September 4, 1952, Serial No. 307,837

Claims priority, application Germany October 10, 1951

4 Claims. (Cl. 322—26)

My invention relates to electric apparatus for producing alternating currents of a definite wave shape in synchronism with the cycle of a rotating structure under observation.

Such synchronized currents are required, for instance, for reference purposes in balancing machines, or for analyzing vibrations or measuring other phenomena associated with the revolution of structure. As a rule, a particular and accurate wave shape of the alternating current is required or preferable. For instance, when testing a rotor for unbalance on the wattmetric principle, the voltage of a vibration pickup is applied to the voltage coil of a wattmeter, and the reference current, passing through the current coil of the same wattmeter, is supposed to have a strictly harmonical wave shape synchronized with the revolution of the structure whose unbalance vibrations are sensed by the pickup. When exacting accuracy requirements are to be met, it is undesirable or infeasible to mechanically couple a sine-wave current generator of the rotary type with the revolving structure under observation, because such a mechanical connection may cause measuring faults due to its reaction upon the revolving structure. Resort must then be had to a photo-electric or similarly reaction-free scanning of the revolving structure to control the means for generating a pure harmonical current.

The production of such harmonical currents by photo-electric scanning has been far from satisfactory for high-accuracy requirements. It has been proposed to distribute over the peripheral surface of the revolving structure a graduated black-and-white arrangement of markings to be scanned photo-electrically. To accurately apply such an arrangement, a stencil or printing method is preferably employed. If it is desired to selectively or simultaneously produce alternating currents of respectively different phase positions, either two equally subdivided black-and-white distributions must be applied to the periphery of the revolving structure in angularly different positions, or the photo-electric pickup device must be duplicated or made angularly displaceable about the axis of revolution.

It is among the objects of my invention to provide a photo-electrically controlled and hence reaction-free apparatus generally of the above-mentioned kind that is capable of producing revolution-synchronized alternating currents of a strictly harmonical or other accurately determined wave shape with the aid of especially simple devices of high precision and reliable constancy, and that conveniently affords a better versatility or a larger multiplicity of selectively or simultaneously available currents than heretofore practicable.

According to my invention, I provide a rotatable surface member, to be joined with a revolving structure to be tested or forming part thereof, with a ring-shaped and generally black-and-white type marking that is composed only of a single "white" or more-reflective section and a single "black" or less-reflective section so that the photo-electric pickup, scanning the ring-shaped marking area, issues but one current pulse wave for each full revolution, this pulse wave having, for instance, a rectangular or trapezoidal wave shape. I further supply this pickup current, upon amplification, to the control or energizing circuit of a synchronous electric motor and mechanically connect with that motor one or more rotary alternating-current generators to provide the desired alternating currents of the proper wave shape, intensity, and phase position. These currents are then available for excitation purposes in strict synchronism with the cycle period of the revolving structure under observation and, hence, may be supplied, for instance, to the current coil of the above-mentioned wattmeter of balance-analyzing equipment.

An advantage of such an apparatus according to my invention lies in the fact that the annular single black-and-white or bright-and-dark subdivision can be applied to a revolvable structure without appreciable difficulty while securing the utmost degree of precision since only a single response of the photo-electric pickup during each full revolution is required. Besides, accurately harmonic alternating currents of respectively different phase position, for instance, a purely sinusoidal current and a purely co-sinusoidal current, may be supplied, either simultaneously or alternately or selectively, in a convenient manner. A rapid transfer from one output current to the other is also very simple. With a balancing machine for indicating the unbalance on the wattmetric principle by two angularly coordinate components, an apparatus according to the invention offers the possibility of substituting the conventional mechanical coupling by a photo-electric coupling thus improving the accuracy of the unbalance analysis. Besides, the single black-and-white subdivision of the rotating marking zone in conjunction with the provision of a synchronous motor also secures a more accurately phase-adjusted and phase-constant synchronization.

The foregoing and other objects, advantages and features of my invention will be apparent from the following description in conjunction with the drawing, in which—

Figure 1:
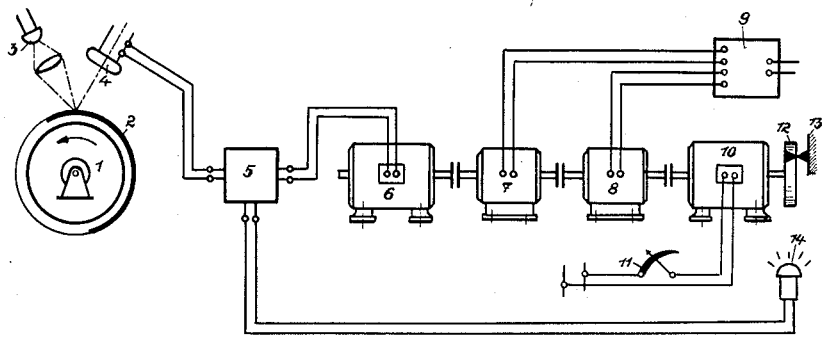
Fig. 1 shows diagrammatically an apparatus according to the invention equipped with a rotating disc whose peripheral surface has a single black-and-white subdivision.
Figure 4:
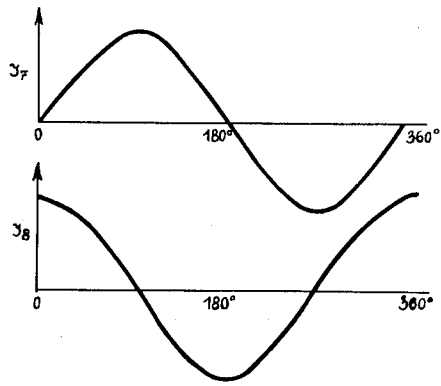
Figure 6:
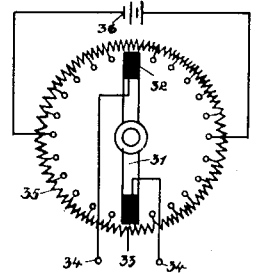
Figure 5:
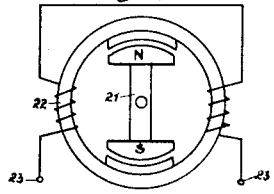

Figs. 4a and 4b exemplify by coordinate diagrams the time curves of two harmonic output currents obtainable with apparatus according to Fig. 1; and Figs. 5 and 6 illustrate schematically two respective alternating-current generators applicable in apparatus according to Fig. 1.

As illustrated in Fig. 1, a disc-shaped member 1 is mounted for revolution about its axis. This member may consist of a body or structure under observation, for instance, in a balancing machine, or it may consist of a separate structure coaxially joined with the rotor under observation to revolve together therewith. The periphery of the disc member 1 is provided with a black-and-white subdivision 2 whose one half is white or bright (reflective) and whose other half is black or dark (less reflective or non-reflective). The subdivision may be in accordance with the development shown in Fig. 2a.

Figure 3:
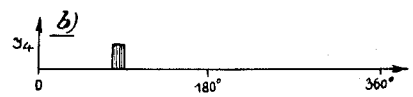
Figs. 3a, 3b and 3c are coordinate diagrams representing the photo-electric current pulses obtainable with peripheral zones corresponding to Figs. 2a, 2b and 2c respectively.

A lamp, shown at 3 in Fig. 1, throws a beam of light which may be focused by a lens, onto the black-and-white zone of disc member 1 so that the light is alternately reflected and not reflected during each rotation of the member. Each reflected beam of light impinges upon a photo-electric cell 4 which issues a current pulse to an amplifier 5. The current pulse is synchronous with the rotation of the member 1 and has a square-top wave, for instance, of rectangular shape as indicated in Fig. 3a. The output terminals of the amplifier 5 are connected to a synchronous motor, and the amplification is sufficient for driving the motor 6 in synchronism and accurate phase relation to the rotating member 1. One or several alternating current generators as shown at 7 and 8 are mechanically joined with the shaft of the synchronous motor 6, for instance, by couplings or clutches. The current generated by generators 7 and 8 have the required particular characteristics, and it will be recognized that these generators are driven as if they were directly and mechanically connected with the rotating member 1. The generator current, if desired, may be passed through an amplifier 9 before serving the desired purpose. That is, the output current may be supplied to the above-mentioned current coil of a wattmeter pertaining to the unbalance analyzing system of a balancing machine.

Of particular interest, especially for balance-analyzing purposes, are strictly harmonic shapes of the generated alternating currents such as the currents $J_7$ and $J_8$ shown in Figs. 4a and 4b in dependence upon the rotary position of the rotating member 1. The current $J_7$ is purely sinusoidal while the current $J_8$ has cosine shape.

Various types of rotary alternating current generators are applicable for the purposes of the invention. For instance, the generators may consist of a dynamo-electric machine. As an example, Fig. 5 shows a dynamo whose rotor 21 has a two-pole permanent magnet which, during rotation, induces the alternating current in the generator coils 22 connected to the output terminals of the machine.

However, the alternating current generators in apparatus according to the invention may also consist of the type in which a brush pair and a commutator revolve one relative to the other, and in which the individual commutator sectors are supplied with respectively different electric potentials graduated by means of resistors or other circuit devices to produce the desired sinusoidal characteristic. An example of such a resistance-commutator type machine is illustrated in Fig. 6. The rotating portion 31 of the machine carries two mutually insulated brushes 32 and 33 which are connected to the output terminals 34 through slip rings (not shown). The brushes slide over the commutator segments here represented by the tap points of a closed series of resistors 35 which interconnect the segment and are graduated in accordance with the desired shape of the terminal voltage. Two diametrically opposite points of the resistor arrangement are energized from a source 36 of constant direct current. It will be recognized that during the rotation of rotor 31 an alternating voltage is impressed across the output terminals 34

The above-mentioned dynamo-electric alternators with rotating permanent magnets or otherwise constantly excited fields produce an alternating output current whose effective value (average value) increases in an approximately linear proportion to the frequency of revolution. Consequently, a voltmeter connected into the output circuit may conveniently be used for remote measuring or remote control. Generators according to the resistance-commutator principle, as exemplified by Fig. 6, furnish alternating output currents whose effective value is independent of the frequency. Such alternating currents, however, do not have a completely continuous characteristic and are therefore only approximately sinusoidal, i. e. not completely free of odd upper harmonics.

The operation of generators as described in the foregoing involves losses due to the friction. This is especially the case with generators of the resistance-commutator type due to the fact that the brush friction must be overcome. For some applications, therefore, it is advantageous to relieve the photo-electrically controlled synchronous motor from the duty of providing the torque required for overcoming this friction. To this end, and as shown in Fig. 1, the illustrated motor-generator set is equipped with an auxiliary motor 10 which is coaxially coupled with the rest of the set. The motor 10 should provide a torque which, as much as feasible, is independent of the speed of revolution and which corresponds to the average torque requirements of the alternating current generators. Then the synchronous motor 6 is called upon only to synchronize the revolution of the set. Consequently, the motor 6 may be given a smaller power rating, and the shape of its poles may be more readily designed for securing the best obtainable accuracy of synchronism.

Figure 2:
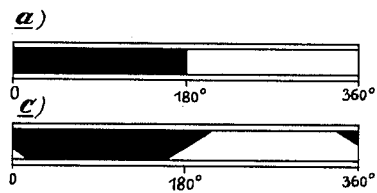
Figs. 2a, 2b and 2c show three respective embodiments of the black-and-white subdivision by a developed representation of the peripheral disc surface.
Figure 2:
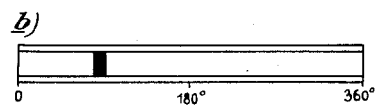
Figure 2:
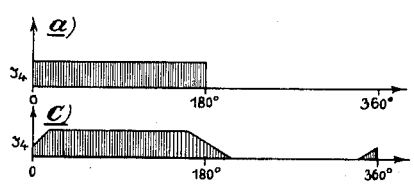

The auxiliary motor 10 may consist of a universal-type motor and may be energized through a starting or regulating rheostat 11 from a power supply line. The auxiliary motor is advantageously used for starting the entire set up to synchronous speed so that the synchronous motor 6 need not be equipped with starting facilities. Since in the just-mentioned apparatus the synchronous motor 6 functions essentially in a regulating or correcting sense, a black-and-white subdivision as shown in Fig. 2b is sometimes preferable. According to this subdivision, one of the two surface sections is greatly preponderant over the other in peripheral length so that the resulting photo-electric current pulse is essentially short pip as apparent from Fig. 3b.

For correctly controlling or regulating the auxiliary motor 10 and for supervising the synchronization it is further of advantage to mount on the axis of the motor-generator set a disc or similar indicator member 12 with a synchronizing mark illuminated stroboscopically by an inertia-free light source 14. This light source, consisting for instance of a neon lamp, receives its voltage from the amplifier 5, thus issuing intermittently a light flash in the rhythm of the rotation of the structure 1. Illuminated by the repetitive flashes, the mark 12 appears to stand still. If the torque supplied by the auxiliary motor 10 is correct, then the mark 12 appears to be at rest precisely in front of a stationary mark 13. When the torque of the auxiliary motor 10 is too small, the remaining torque must be furnished by the synchronous motor 6 so that its rotor may lag relative to its rotating field. As a result, the mark 12 also seems to be lagging. If the torque of the auxiliary motor 10 is too large, the synchronous motor 6 must exert a braking moment. Its rotor then tends to lead the field so that the mark 12 also appears to advance relative to the stationary mark 13. Consequently, the observation of the stroboscopically illuminated marks 12 and 13 readily permits an accurate adjustment of the torque of the auxiliary motor 10 by means of the control rheostat 11.

When the rotating structure under observation is driven by a rotating field, which may be the case, for instance, with the rotor of a gyroscope, then its speed of revolution remains practically constant. For this purpose, the auxiliary motor 10 is preferably so pre-adjusted that it drives the motor-generator set at approximately the revolving speed of the rotating structure under observation. In cases where the rotating structure, such as the rotor of a gyroscope, is driven by compressed air, its speed of revolution is not accurately predetermined. For measuring this revolving speed and for maintaining it at a desired magnitude, a tachometer may be used together with the motor-generator set; for instance, an electromagnetic frequency indicator of the tuning-fork type may be excited from one of the generators. A generator with a voltage proportional to the frequency, such as a tachometer generator, may also be used in conjunction with a voltmeter which, if desired, may be calibrated in speed values.

It will be understood from a study of this disclosure that apparatus according to my invention may be modified as to various details and may be embodied in specific apparatus other than illustrated and described, without departing from the essential features of my invention and within the scope of the claims annexed hereto.

I claim:

1. Electric apparatus for producing alternating current in synchronism with a rotating body, comprising a rotatable surface member with an annular surface zone having only two zone sections of optically different reflectivity, a photo-electric pickup responsive to radiation reflected from said zone to produce a current pulse during each full rotation of said member, a synchronous motor, amplifying circuit means electrically connecting said motor with said pickup, rotary alternating-currrent generator means mechanically connected with said synchronous motor, and a separately energized auxiliary motor also connected with said generating means and having a driving power corresponding substantially to the average torque requirement of said generating means.

2. Electric apparatus for producing alternating current in synchronism with a rotating body, comprising a rotatable surface member with an annular surface zone having only two zone sections of optically different reflectivity, a photo-electric pickup responsive to radiation reflected from said zone to produce a current pulse during each full rotation of said member, a synchronous motor, amplifying circuit means electrically connecting said motor with said pickup, rotary alternating-current generator means mechanically connected with said synchronous motor, an auxiliary motor also connected with said generating means and having a driving power corresponding substantially to the average torque requirement of said generating means, a power supply circuit connected with said auxiliary motor and having a motor starter for starting said synchronous motor and said generating means by operation of said auxiliary motor.

3. Electric apparatus for producing alternating current in synchronism with a rotating body, comprising a rotatable surface member with an annular surface zone having only two zone sections of optically different reflectivity, a photo-electric pickup responsive to radiation reflected from said zone to produce a current pulse during each full rotation of said member, a synchronous motor, amplifying circuit means electrically connecting said motor with said pickup, rotary alternating-current generator means mechanically connected with said motor to be driven thereby, an auxiliary motor mechanically connected with said generator means, and a stroboscope device having a revolvable indicator member in mechanical connection with said generator means and having a flash lamp electrically connected with said amplifying circuit means to be flashed in accordance with said current pulse, the light from said flash lamp falling on said indicator member for indicating phase relationship between said rotating body and said generator means.

4. Electric apparatus for producing alternating current in synchronism with a rotating body, comprising a rotatable surface member with an annular surface zone having only two zone sections of optically different reflectivity, a photo-electric pickup responsive to radiation reflected from said zone to produce a current pulse during each full rotation of said member, a synchronous motor, amplifying circuit means electrically connecting said motor with said pickup, rotary alternating-current generator means mechanically connected with said synchronous motor, an auxiliary motor also mechanically connected with said generating means, a power supply circuit electrically connected with said auxiliary motor and having control means for varying the torque of said auxiliary motor, and a stroboscope device having a fixed reference mark and a mark revolvable with said generating means, said device having a flash lamp electrically connected with said amplifying circuit means to be flashed in accordance with said current pulse to permit adjusting said torque to the torque requirements of said generating means by setting said control means to a given indication of said stroboscope device.

References Cited in the file of this patent

UNITED STATES PATENTS

| | | |
|---|---|---|
| 1,450,340 | Smith et al. | Apr. 3, 1923 |
| 1,618,757 | Hoxie | Feb. 22, 1927 |
| 1,856,076 | Karolus | May 3, 1932 |
| 1,976,355 | Mees et al. | Oct. 9, 1934 |
| 2,213,108 | Pollard | Aug. 27, 1940 |
| 2,243,379 | Johnson | May 27, 1941 |
| 2,451,863 | Oakley | Oct. 19, 1948 |
| 2,523,993 | McCandless | Sept. 26, 1950 |